US010775979B2

(12) United States Patent
    Xu

(10) Patent No.: US 10,775,979 B2
(45) Date of Patent: Sep. 15, 2020

(54) BUDDY LIST PRESENTATION CONTROL METHOD AND SYSTEM, AND COMPUTER STORAGE MEDIUM

(71) Applicant: Tencent Technology (Shenzhen) Company Limited, Shenzhen (CN)

(72) Inventor: Zhifen Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 23 days.

(21) Appl. No.: 16/258,334

(22) Filed: Jan. 25, 2019

(65) Prior Publication Data

US 2019/0155488 A1    May 23, 2019

Related U.S. Application Data

(63) Continuation of application No. 14/718,164, filed on May 21, 2015, now Pat. No. 10,235,024, which is a
    (Continued)

(30) Foreign Application Priority Data

Nov. 23, 2012    (CN) .......................... 2012 1 0484384

(51) Int. Cl.
    *G06F 3/0484*    (2013.01)
    *G06F 3/0488*    (2013.01)
    (Continued)

(52) U.S. Cl.
    CPC ........ *G06F 3/04842* (2013.01); *G06F 3/0482* (2013.01); *G06F 3/0488* (2013.01);
    (Continued)

(58) Field of Classification Search
    CPC .. G06F 3/04842; G06F 3/0482; G06F 3/0488; G06Q 10/10; G06Q 10/107; H04L 51/046
    See application file for complete search history.

(56) References Cited

U.S. PATENT DOCUMENTS 7,216,304 B1 * 5/2007 Gourdol ................. G06F 9/451
                                                      715/835
8,938,677 B2    1/2015 Geppert et al.
                (Continued)

FOREIGN PATENT DOCUMENTS

CN    101433034 A    5/2009
CN    101867635 A    10/2010
        (Continued)

OTHER PUBLICATIONS

Office Action in CN Appln: 201210484384.X dated Jan. 26, 2017, 7 pgs.
(Continued)

*Primary Examiner* — Stella Higgs
(74) *Attorney, Agent, or Firm* — Morgan, Lewis & Bockius LLP

(57) ABSTRACT

The present disclosure provides a buddy list presentation control method and system, and a computer storage medium. The method includes the following steps: acquiring user information, the user information including buddy grouping information; determining whether the acquired user information further includes theme cover information separately corresponding to each buddy group; and adding, if not, a corresponding theme cover to each buddy group separately according to a preset rule, and then, presenting a buddy grouping list obtained by adding the theme covers. According to the method, the system and the computer storage medium in embodiments of the present invention, recogni-
(Continued)

tion and operability of buddy grouping are improved, and an operation cost and operation difficulty are lowered.

15 Claims, 4 Drawing Sheets

Related U.S. Application Data continuation of application No. PCT/CN2013/086916, filed on Nov. 12, 2013.

(51) Int. Cl.
*G06F 3/0482* (2013.01)
*G06Q 10/10* (2012.01)
*H04L 12/58* (2006.01)

(52) U.S. Cl.
CPC .......... *G06Q 10/10* (2013.01); *G06Q 10/107* (2013.01); *H04L 51/046* (2013.01)

(56) References Cited

U.S. PATENT DOCUMENTS

| | | | |
|---|---|---|---|
| 2004/0148346 A1* | 7/2004 | Weaver | H04L 12/1822 709/204 |
| 2006/0156247 A1* | 7/2006 | McCormack | G06F 3/0481 715/767 |
| 2007/0177803 A1* | 8/2007 | Elias | G06F 3/04883 382/188 |
| 2007/0259654 A1 | 11/2007 | Oijer | |
| 2007/0271367 A1 | 11/2007 | Yardeni et al. | |
| 2009/0144211 A1* | 6/2009 | O'Sullivan | G06Q 30/02 706/14 |
| 2010/0153876 A1* | 6/2010 | Kim | G06F 3/0482 715/800 |
| 2010/0153886 A1 | 6/2010 | Hautala | |
| 2011/0249144 A1 | 10/2011 | Chang | |

FOREIGN PATENT DOCUMENTS

| | | |
|---|---|---|
| CN | 102298628 A | 12/2011 |
| CN | 102368749 A | 3/2012 |

OTHER PUBLICATIONS

Search Report in International Application No. PCT/CN2013/086916, dated Feb. 27, 2014.
International Preliminary Report on Patentability and Written Opinion in International Application No. PCT/CN2013/086916 dated May 26, 2015, 8 pgs.

\* cited by examiner

BUDDY LIST PRESENTATION CONTROL METHOD AND SYSTEM, AND COMPUTER STORAGE MEDIUM

CROSS REFERENCE TO RELATION APPLICATIONS

This application is a continuation application of U.S. patent application Ser. No. 14/718,164, entitled "BUDDY LIST PRESENTATION CONTROL METHOD AND SYSTEM, AND COMPUTER STORAGE MEDIUM" filed on May 21, 2015, which is a continuation of PCT Application No. PCT/CN2013/086916, filed on Nov. 12, 2013, which claims priority to Chinese Patent Application No. 201210484384.X, filed with the Chinese Patent Office on Nov. 23, 2012, all of which are incorporated by reference in their entirety.

TECHNICAL FIELD

The present disclosure relates to the field of human computer interaction, and in particular, to a buddy list presentation control method, a buddy list presentation control system, and a computer storage medium.

BACKGROUND OF THE DISCLOSURE

Up to today, an instant messaging (IM) platform has been accepted by most netizens and become an indispensable communication means of users. Basic data content on the IM platform is a user group that a user is concerned about and in direct instant-messaging contact with. Generally, the group is referred to as "buddies" of the user. As a time of use of the IM platform by a user for communication increases, the user accumulates a great number of buddies. These buddies are collected into a buddy list of the user and presented to the user in a form of a buddy list on an IM terminal. For an IM system, the place and importance of buddies in the buddy list are the same and indiscriminate; however, for the user, attention paid to each buddy may be different, and moreover, perspectives to which attention is paid are also different, which affect a buddy classification form of the user.

Therefore, based on a buddy list, in combination with the attention that a user pays to a buddy, the concept of buddy grouping is developed on an existing IM platform. That is, the user may classify the buddy list into several categories and specify a grouping attribute for each buddy according to the will of the user. Groups customized by the user and buddies in each group are recorded in a database of a server. When the user logs in to an IM client, an IM terminal synchronizes grouping information with the server automatically. Therefore, when the user logs in by using different terminals in different locations and scenarios, grouping consistency can be maintained.

Currently, with the development of mobile terminal technologies and fast establishment of a relationship chain of contacts in instant messaging software, a buddy list becomes overcrowded in an accumulation process of the relationship chain of contacts, thereby causing many problems in buddy management and operations. In addition, conventional buddy lists are all presented in a combination form of a vertical list and text, which is suitable for a PC operation. However, as mobile terminal technologies and devices develop rapidly, due to features of a mobile scenario, in a conventional method, there must be some limitations to adaptation and operation of an intelligent mobile terminal. A most prominent manifestation is that, due to low recognition of text, an operation cost and operation difficulty are relatively high when a text list form that is originally suitable for a PC operation is used in a mobile scenario.

SUMMARY

In view of this, it is necessary to provide a buddy list presentation control method and system, to solve the foregoing problem that recognition is relatively low.

A buddy list presentation control method includes the following steps:

acquiring user information, the user information including buddy grouping information;

determining whether the acquired user information further includes theme cover information separately corresponding to each buddy group; and adding, if not, a corresponding theme cover to each buddy group separately according to a preset rule, and then, presenting a buddy grouping list obtained by adding the theme covers.

A buddy list presentation control system includes:

an information acquiring module, configured to acquire user information, the user information including buddy grouping information;

a determining module, configured to determine whether the acquired user information further includes theme cover information separately corresponding to each buddy group; and a first presentation module, configured to add, if a determining result of the determining module is no, a corresponding theme cover to each buddy group separately according to a preset rule, and then, present a buddy grouping list obtained by adding the theme covers.

It can be seen from the foregoing solutions that, according to the buddy list presentation control method and system in embodiments of the present invention, a theme cover is assigned to each buddy group and a conventional text list form is converted into a picture-based presentation form. A user can customize group presentation and a group cover according to a requirement of the user, so that recognition is greatly improved; in addition, by using the solutions of the embodiments of the present invention, the user can do more DIY, which improves recognition and operability of buddy grouping, and lowers an operation cost and operation difficulty.

DESCRIPTION OF EMBODIMENTS

The following describes the solutions in the embodiments of the present invention in detail with reference to the preferred implementation manners.

Figure 1:
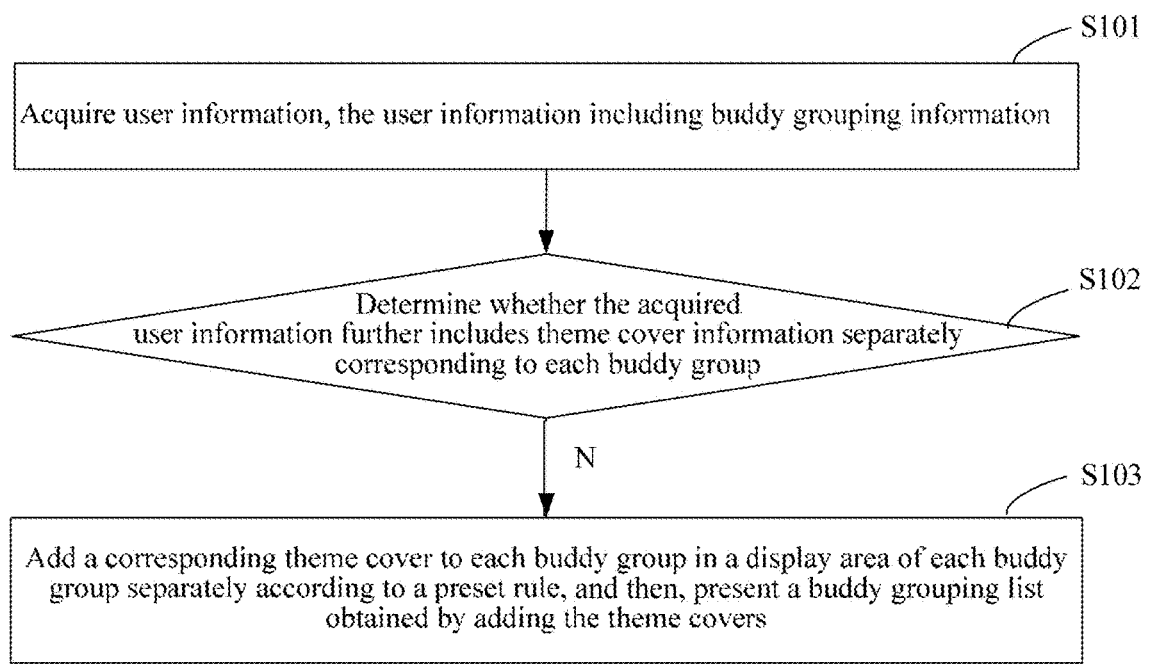
FIG. 1 is a schematic flowchart of a buddy list presentation control method according to an embodiment.

Referring to FIG. 1, a buddy list presentation control method includes the following steps:

Step S101: Acquire user information. Information related to a user is generally stored in a database of a server or is directly stored locally (that is, in a terminal), and therefore, after logging in each time, the user may acquire user information from the server or the local terminal. The acquired information mainly includes information such as buddy grouping information, detailed information about each buddy, and a current state of each buddy.

Step S102: Determine whether the acquired user information further includes theme cover information separately corresponding to each buddy group; and if not, perform step S103.

Figure 2:
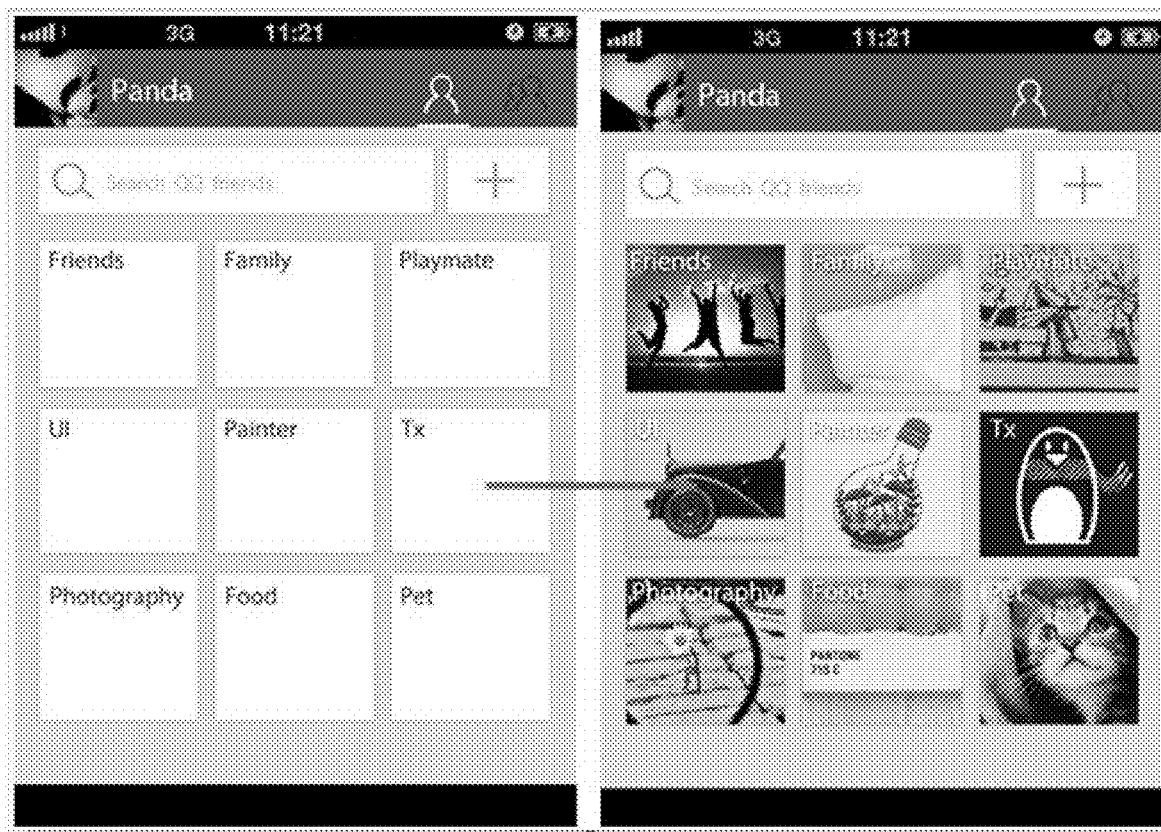
FIG. 2 is a schematic diagram of assignment of theme covers to buddy groups according to an embodiment.

Among an entire terminal user interface (UI), an image may be quickly and efficiently recognized. Therefore, in this embodiment of the present invention, a conventional text list form is intended to be converted into an image-based presentation form. FIG. 2 is a schematic diagram of a desired effect in this embodiment of the present invention. A corresponding theme cover is assigned to each buddy group, and the theme cover is combined with a group name, which improves recognition greatly. Because of this, this embodiment of the present invention provides such a determining step. If it is found through determining that the acquired user information includes theme cover information separately corresponding to each buddy group, it indicates that a buddy list in a terminal has been processed, and can be acquired and then directly presented in the terminal. If it is found through determining that the acquired user information does not include theme cover information separately corresponding to each buddy group, it indicates that the buddy list in the terminal is not presented in an image-based form but still in a conventional text list form at this time, and therefore, the buddy list needs to be preprocessed first and then information is stored after the processing is completed. In this way, the stored user information can be acquired directly for presentation in a subsequent process. For a specific process of the foregoing preprocessing, reference may be made to step S103.

Step S103: Add, if not, that is, it is found through determining that the acquired user information does not include theme cover information separately corresponding to each buddy group, a corresponding theme cover to each buddy group separately according to a preset rule, and then, present a buddy grouping list obtained by adding the theme covers.

In an embodiment, after the buddy grouping list to which the theme covers are added in step S103 is obtained, the buddy grouping list may be sent to the server for storage. In this way, user information that is acquired by the terminal from the server next time includes the theme cover information and can be acquired directly for presentation.

In another embodiment, after the buddy grouping list to which the theme covers are added is obtained, the buddy grouping list may be not uploaded to the server but is directly stored locally.

As a preferred embodiment, the buddy list presentation control method may further include the following step: if it is determined that the acquired user information further includes theme cover information separately corresponding to each buddy group, presenting the acquired user information directly. At this time, the buddy list is presented as shown by the right part in FIG. 2. Each buddy group has a corresponding theme cover, and the theme cover is combined with a group name, which improves recognition greatly.

Figure 3:
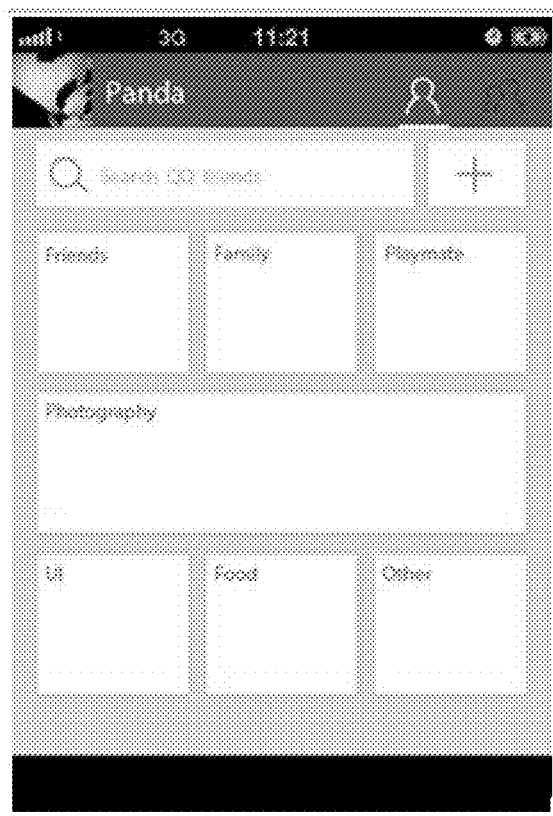
FIG. 3 is a schematic diagram of customizing of a buddy grouping presentation form according to an embodiment.

As a preferred embodiment, after it is determined that the acquired user information does include theme cover information separately corresponding to each buddy group, before adding a corresponding theme cover to each buddy group separately according to a preset rule, the method may include a step of: obtaining through division, according to the buddy grouping information, a display area of a preset size for displaying each buddy group. The size of the display area may be set differently according to different actual application requirements. In an embodiment, the display area may be set to be rectangular and a length-width ratio is 9:8. Further, the user may select a presentation size of a buddy group according to importance of each buddy group, for example, there are two sizes for the display area: a big size and a small size; the two sizes are same in height but are different in width, and the width of the big size may be three times of the width of the small size plus widths of gaps between the small sizes, as shown in FIG. 3. In an embodiment, a three-row three-column layout may be used as a standard for each screen. The buddy group is adjusted dynamically, and for the big size, one buddy group is displayed in one row, and for the small size, three buddy groups are displayed in one row.

In addition, as a preferred embodiment, the process of adding a corresponding theme cover to each buddy group separately according to a preset rule may include: separately selecting a picture from a preset gallery randomly as the theme cover of each buddy group for each buddy group. Certainly, the theme cover may also be added in another manner, for example, after obtaining through division the display area, the user may click the buddy groups one by one to select a customized picture for each buddy group for matching. It should be noted that, no matter what manner is used, after adding and binding a picture as a theme cover in a display area, the user may further change, by opening a buddy group, a theme cover of the group. After receiving an instruction sent by a user for opening any buddy group, a terminal provides a prompt of adding a theme cover to a display area of the buddy group, and when accepting the prompt and changing a theme cover, the user needs to store the added theme cover in time, so as to be used next time.

Figure 4:
FIG. 4 is a schematic diagram of opening a current buddy group by an unfolding operation and closing the current buddy group by a gathering operation according to an embodiment.

In addition, in accordance with a habit of using a PC, most contacts all operate a buddy list by sliding up and down. When contacts are accumulated to an extent, a cost of searching for a buddy increases. To solve the problem, in this embodiment of the present invention, in combination with features of an intelligent mobile terminal, more gesture operations are used to make operations easier. Specifically, as a preferred embodiment, after presenting the acquired user information, the method may further include the following steps:

opening any buddy group when it is detected that there is an unfolding operation performed by at least three fingers in a display area of the buddy group, as shown in the left part in FIG. 4, where details of a buddy in the group can be viewed after the buddy group is opened; and in a situation in which a buddy group is opened, closing the buddy group when it is detected that there is a gathering operation performed by at least three fingers, as shown in the right part in FIG. 4, where after the buddy group is closed, the previous buddy grouping list is presented.

It should be noted that, in this embodiment of the present invention, a reason for setting more than three fingers is that, in a general sense, an unfolding/gathering operation performed by two fingers is considered to be an operation of magnifying/minifying a current page. Therefore, it is necessary to avoid a clash with an existing operation.

Certainly, a conventional manner of clicking a buddy group directly can also be used for the foregoing operation of opening the buddy group; a return label at the left corner may also be clicked to close the buddy group. In this embodiment of the present invention, gesture operations are added to original click operations. The operation gestures are simple to use, a user can learn the operation gestures with a low cost and use the operation gestures with high efficiency, and the operation gestures are easier and more convenient to use in a mobile scenario. In combination with such grouping presentation, the operation gestures are more suitable for use expectation of users.

When a buddy group is opened, a buddy list may be presented by same squares. In an embodiment, a four-row four-column layout may be set as a standard for a screen. In this way, one screen can present more members, which enables the user to browse group members conveniently and rapidly.

Figure 5:
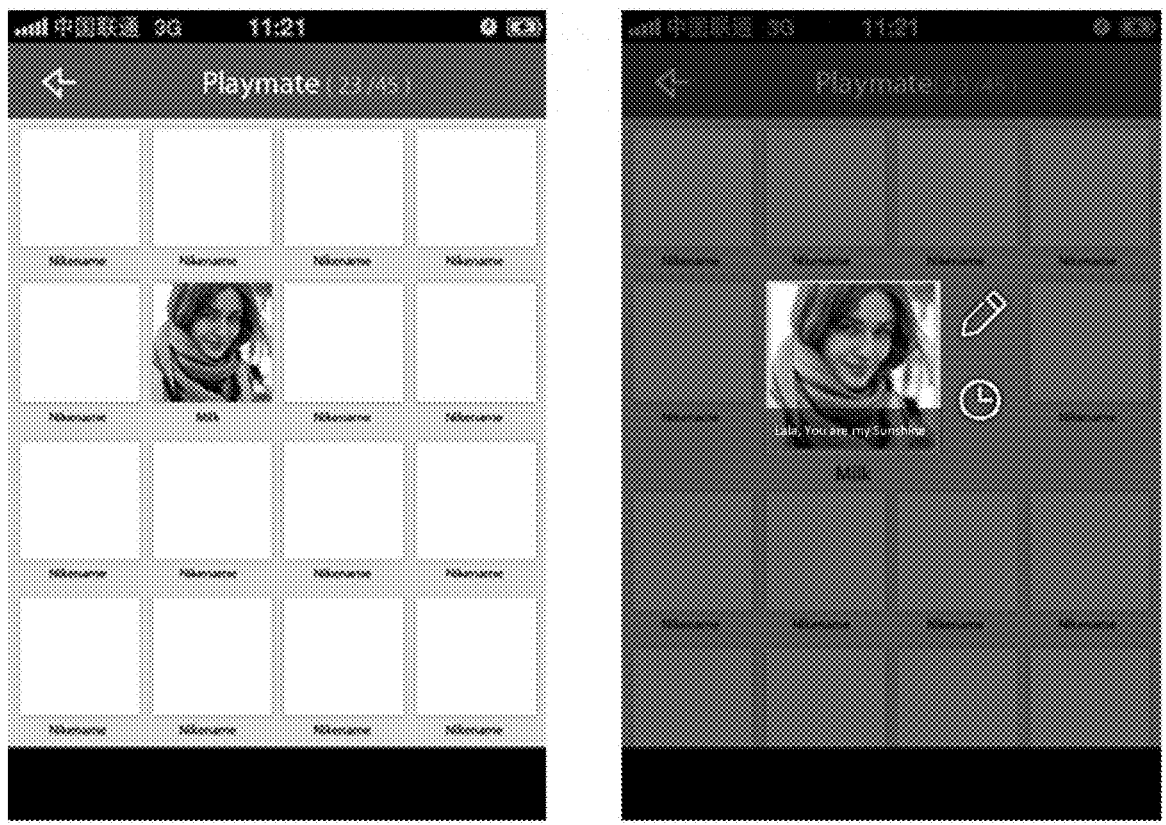
FIG. 5 is a schematic diagram of displaying a buddy profile picture in a magnified manner and displaying functional buttons according to an embodiment.

In addition, in this embodiment of the present invention, an unfolding gesture event and a gathering gesture event are further added for each buddy of the user. As a preferred embodiment, after a buddy group is opened, the method further includes the following steps:

displaying a buddy profile picture in a magnified manner and displaying functional buttons in a preset area when it is detected that there is an unfolding operation performed by at least two fingers on the buddy profile picture (in this case, it does not need to consider the problem that the operation collides with an operation of magnifying a current page), as shown in FIG. 5, where the functional buttons include a label adding button and a scrawl button; and in a situation in which the buddy profile picture is displayed in a magnified manner, closing a magnifying display function and concealing the functional buttons when it is detected that there is a touch event in an area outside the buddy profile picture.

Figure 6:
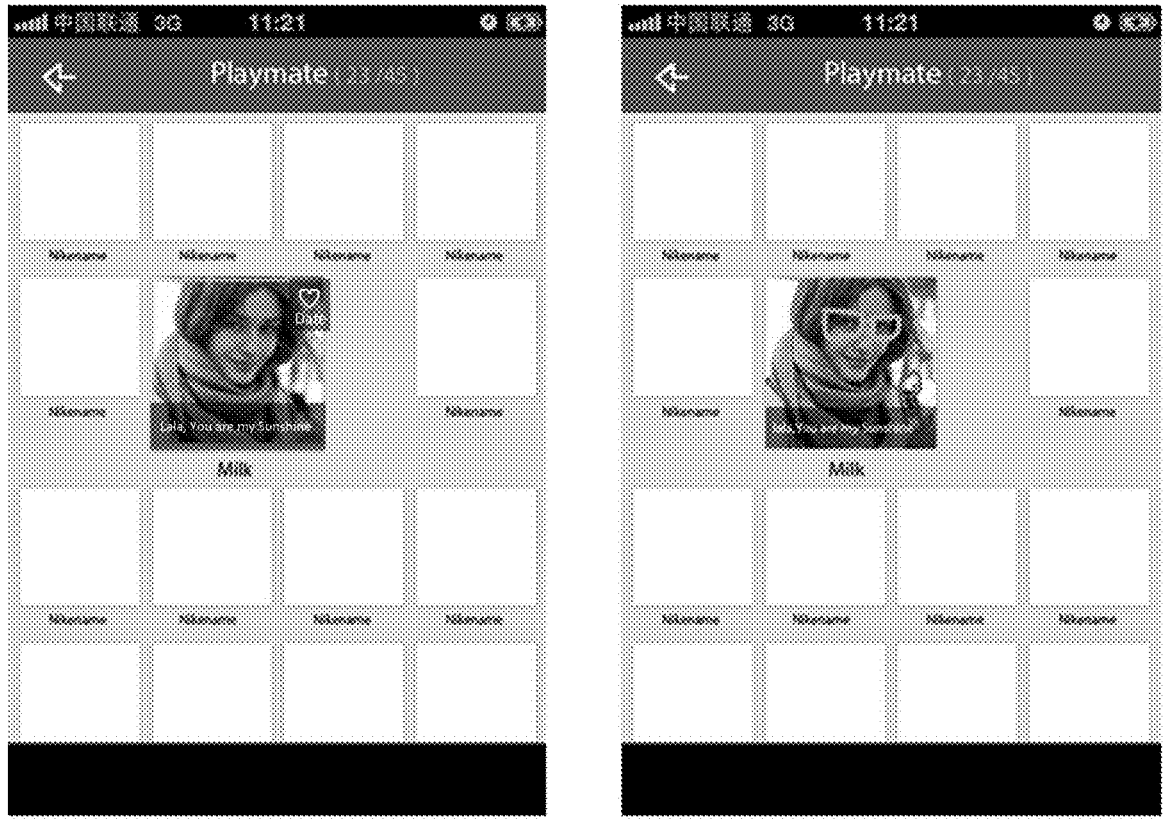
FIG. 6 is a schematic diagram of a label adding interface and a scrawl operation according to an embodiment.

As shown in FIG. 6, in this embodiment of the present invention, it can help the user to kill time by adding small functions such as a date reminder function (left in FIG. 6), a label function, and a scrawl function (right in FIG. 6) for the user, which improves playability of an application.

According to the buddy list presentation control method in this embodiment of the present invention, a theme cover is assigned to each buddy group and a conventional text list form is converted into a picture-based presentation form. A user can customize group presentation and a group cover according to a requirement of the user, so that recognition is greatly improved; in addition, by using the method in this embodiment of the present invention, the user can do more DIY, which improves recognition and operability of buddy grouping, and lowers an operation cost and operation difficulty.

Figure 7:
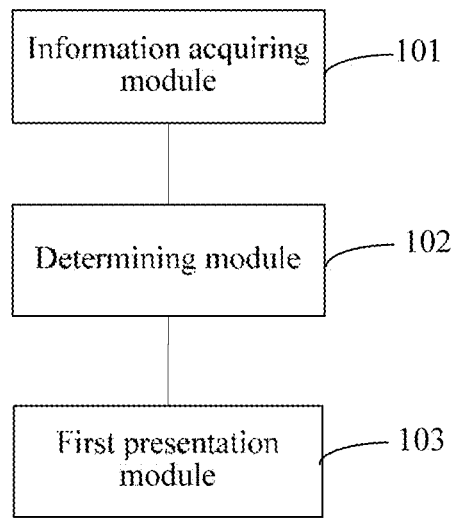
FIG. 7 is a schematic structural diagram of a buddy list presentation control system according to an embodiment.

Corresponding to the buddy list presentation control method, an embodiment of the present invention further provides a buddy list presentation control system, as shown in FIG. 7, including:

an information acquiring module 101, configured to acquire user information, the user information including buddy grouping information and the like;

a determining module 102, configured to determine whether the acquired user information further includes theme cover information separately corresponding to each buddy group; and a first presentation module 103, configured to add, if a determining result of the determining module is no, a corresponding theme cover to each buddy group separately according to a preset rule, and then, present a buddy grouping list obtained by adding the theme covers.

As a preferred embodiment, the presentation control system further includes a second presentation module, configured to present the acquired user information directly when the determining result of the determining module 102 is yes.

As a preferred embodiment, the first presentation module 103 may include a display area division module, configured to obtain through division, according to the buddy grouping information, a display area of a preset size for displaying each buddy group. The size of the display area may be set differently according to different actual application requirements. In an embodiment, the display area may be set to be rectangular and a length-width ratio is 9:8. Further, the user may select a presentation size of a buddy group according to importance of each buddy group, for example, there are two sizes for the display area: a big size and a small size; the two sizes are same in height but are different in width, and the width of the big size may be three times of the width of the small size plus widths of gaps between the small sizes. In an embodiment, a three-row three-column layout may be used as a standard for each screen.

As a preferred embodiment, the first presentation module 103 may include a random selection module, configured to separately select a picture from a preset gallery randomly as the theme cover of each buddy group for each buddy group. Certainly, the theme cover may also be added in another manner, for example, after obtaining through division the display area, the user may click the buddy groups one by one to select a customized picture for each buddy group for matching. It should be noted that, no matter what manner is used, after adding and binding a picture as a theme cover in a display area, the user may further change, by opening a buddy group, a theme cover of the group. After receiving an instruction sent by a user for opening any buddy group, a terminal provides a prompt of adding a theme cover to a display area of the buddy group, and when accepting the prompt and changing a theme cover, the user needs to store the added theme cover in time, so as to be used next time.

As a preferred embodiment, the presentation control system may further include:

an unfolding gesture event adding module, configured to open a buddy group when it is detected that there is an unfolding operation performed by at least three fingers in a display area of the buddy group; and a gathering gesture event adding module, configured to:
in a situation in which a buddy group is opened, close the buddy group when it is detected that there is a gathering operation performed by at least three fingers.

As a preferred embodiment, the presentation control system may further include:

a magnifying display event adding module, configured to:
after a buddy group is opened, display a buddy profile picture in a magnified manner and display functional buttons in a preset area when it is detected that there is an unfolding operation performed by at least two fingers on the buddy profile picture, where the functional buttons include a label adding button and a scrawl button; and a screen touch event adding module, configured to: in a situation in which the buddy profile picture is displayed in a magnified manner, close a magnifying display function and conceal the functional buttons when it is detected that there is a touch event in an area outside the buddy profile picture.

Other technical features of the buddy list presentation control system in this embodiment of the present invention are same as those of the buddy list presentation control method, and details are not provided herein again.

It can be seen from the foregoing solutions that, the buddy list presentation control system in this embodiment of the present invention assigns a theme cover to each buddy group and converts a conventional text list form into a picture-based presentation form. A user can customize group presentation and a group cover according to a requirement of the user, so that recognition is greatly improved; in addition, according to the presentation control system in this embodiment of the present invention, the user can do more DIY, which improves recognition and operability of buddy grouping, and lowers an operation cost and operation difficulty.

A person of ordinary skill in the art may understand that all or some of the processes of the method in the foregoing embodiments may be implemented by a computer program instructing relevant hardware. The program may be stored in a computer readable storage medium. When the program runs, processes of the embodiments of the foregoing method may be performed. The storage medium may be a magnetic disk, an optical disc, a read-only memory (ROM), a random access memory (RAM), or the like.

Figure 8:
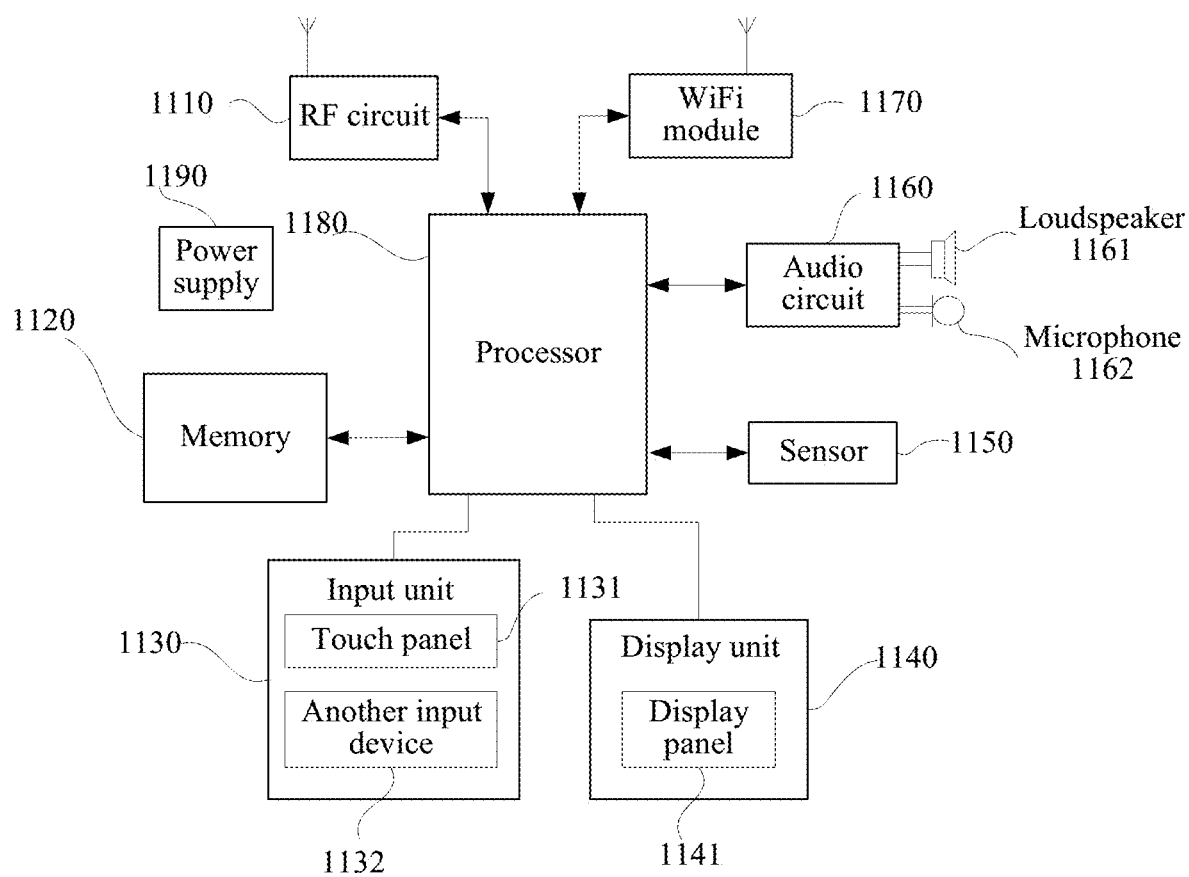
FIG. 8 is a schematic diagram of a partial structure of a mobile phone related to a terminal according to an embodiment of the present invention.

An embodiment of the present invention further provides another buddy list presentation control system, as shown in FIG. 8. For ease of description, only parts related to the embodiment of the present invention are shown, and for specific technical details that are not disclosed, refer to the method part in the embodiments of the present invention. The foregoing buddy list presentation control system may be disposed in a corresponding terminal device. The terminal device herein may be any terminal device, such as a mobile phone, a tablet computer, a personal digital assistant (PDA), a point of sales (POS), an in-vehicle computer. An example in which the terminal is a mobile phone is used.

FIG. 8 is a schematic diagram of a partial structure of a mobile phone related to a terminal according to an embodiment of the present invention. Referring to FIG. 8, the mobile phone includes components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that the structure of the mobile phone shown in FIG. 8 does not constitute a limitation to the mobile phone, and the mobile phone may include more components or fewer components than those shown in the figure, or some components may be combined, or a different component deployment may be used.

The following describes each component of the mobile phone in detail with reference to FIG. 8.

The RF circuit 1110 may be configured to receive and send signals during an information receiving and sending process or a call process. Particularly, the RF circuit 1110 receives downlink information from a base station, then delivers the downlink information to the processor 1180 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 1110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1120 may be configured to store a software program and module corresponding to the method part in the embodiments of the present invention. The processor 1180 runs the software program and module stored in the memory 1120, to implement various functional applications and data processing of the mobile phone. The memory 1120 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1120 may include a high speed RAM, and may also include a non-volatile memory such as at least one magnetic disk storage device, a flash memory, or another volatile solid-state storage device.

The input unit 1130 may be configured to receive input digit or character information, and generate a keyboard signal input related to the user setting and function control of the mobile phone 1100. Specifically, the input unit 1130 may include a touch panel 1131 and another input device 1132. The touch panel 1131, which may also be referred to as a touch screen, may collect a touch operation of a user on or near the touch panel (such as an operation of a user on or near the touch panel 1131 by using any suitable object or accessory such as a finger or a stylus), and drive a corresponding connection apparatus according to a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 1180. Moreover, the touch controller can receive and execute a command sent from the processor 1180. In addition, the touch panel 1131 may be a resistive, capacitive, infrared, or surface sound wave type touch panel. In addition to the touch panel 1131, the input unit 1130 may further include the another input device 1132. Specifically, the another input device 1132 may include, but is not limited to, one or more of a physical keyboard, a functional key (such as a volume control key or a switch key), a track ball, a mouse, and a joystick.

The display unit 1140 may be configured to display information input by the user or information provided for the user, and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1131 transfers the touch operation to the processor 1180, so as to determine the type of the touch event. Then, the processor 1180 provides a corresponding visual output on the display panel 1141 according to the type of the touch event. Although, in FIG. 8, the touch panel 1131 and the display panel 1141 are used as two separate components to implement input and output functions of the mobile phone, in some embodiments, the touch panel 1131 and the display panel 1141 may be integrated to implement the input and output functions of the mobile phone.

The mobile phone 1100 may further include at least one sensor 1150 such as an optical sensor, a motion sensor, and other sensors. Specifically, the optical sensor may include an ambient light sensor and a proximity sensor. The ambient light sensor may adjust luminance of the display panel 1141 according to brightness of the ambient light. The proximity sensor may switch off the display panel 1141 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1160, a loudspeaker 1161, and a microphone 1162 may provide audio interfaces between the user and the mobile phone. The audio circuit 1160 may convert received audio data into an electric signal and transmit the electric signal to the loudspeaker 1161. The loud speaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 680 for processing. Then, the processor 1180 sends the audio data to, for example, another mobile phone by using the RF circuit 1110, or outputs the audio data to the memory 1120 for further processing.

WiFi is a short distance wireless transmission technology. The mobile phone may help, by using a WiFi module 1170, the user to receive and send e-mails, browse a webpage, access streaming media, and so on, which provides wireless broadband Internet access for the user. Although FIG. 8 shows the WiFi module 1170, it may be understood that the WiFi module is not a necessary component of the mobile phone 1100, and when required, the WiFi module may be omitted as long as the scope of the essence of the present disclosure is not changed.

The processor 1180 is the control center of the mobile phone, and is connected to various parts of the mobile phone by using various interfaces and lines. By running or executing the software program and/or module stored in the memory 1120, and invoking data stored in the memory 1120, the processor 1180 performs various functions and data processing of the mobile phone, thereby performing overall monitoring on the mobile phone. Optionally, the processor 1180 may include one or more processing units. Preferably, the processor 1180 may integrate an application processor and a modem. The application processor mainly processes an operating system, a user interface, an application program, and the like. The modem mainly processes wireless communication. It may be understood that the foregoing modem may also not be integrated into the processor 1180.

The mobile phone 1100 further includes the power supply 1190 (such as a battery) for supplying power to the components. Preferably, the power supply may be logically connected to the processor 1180 by using a power management system, thereby implementing functions such as charging, discharging and power consumption management by using the power management system.

Although not shown in the figure, the mobile phone 1100 may further include a camera, a Bluetooth module, and the like, which are not further described herein.

The foregoing embodiments only describe several implementation manners of the present disclosure, and are described in detail, but cannot be understood as a limitation to the patent scope of the present disclosure. It should be noted that, a person of ordinary skill in the art may further make various variations and improvements without departing from the ideas of the present disclosure, which shall fall within the protection scope of the present disclosure. Therefore, the patent protection scope of the present disclosure should be subject to the appended claims.

What is claimed is:

1. A buddy list presentation control method, comprising:
at a computer system having one or more processors and memory storing a plurality of executable instructions:
acquiring user information, the user information comprising buddy grouping information;
determining whether the acquired user information further comprises theme cover information separately corresponding to each buddy group;
adding a corresponding theme cover to each buddy group that does not have theme cover information separately according to a preset rule;
obtaining through division, according to the buddy grouping information, a display area with a preset size for each buddy group, wherein the preset size is selected from a group of different sizes;
presenting a buddy list obtained by presenting the theme cover of each buddy group in its corresponding display area;
opening a respective buddy group in accordance with a detection of an unfolding operation performed by at least three fingers in a display area of the respective buddy group;
displaying a buddy profile picture in a magnified manner and functional buttons in a preset area next to the buddy profile picture in accordance with a detection of an unfolding operation performed by at least two fingers on the buddy profile picture, the functional buttons including at least one of a date reminder button, a label adding button and a scrawl button; and
while displaying the buddy profile picture in the magnified manner:
receiving a first user input activating the date reminder button;
displaying, in response to the first user input, a date reminder icon in a semi-transparent manner within a first region of the buddy profile picture;
receiving a second user input activating the label adding button; and
displaying, in response to the second user input, a label in the semi-transparent manner within a second region of the buddy profile picture, wherein the second region is different from the first region.

2. The buddy list presentation control method according to claim 1, wherein, if it is determined that the acquired user information further comprises theme cover information separately corresponding to each buddy group, the acquired user information is presented directly.

3. The buddy list presentation control method according to claim 1, wherein the process of adding a corresponding theme cover to each buddy group that does not have theme cover information separately according to a preset rule comprises:
separately selecting a picture from a preset gallery randomly as the theme cover of each buddy group for each buddy group.

4. The buddy list presentation control method according to claim 1, further comprising:
closing the buddy group in accordance with a detection of a gathering operation performed by the at least three fingers.

5. The buddy list presentation control method according to claim 1, further comprising:
closing a magnifying display function and concealing the functional buttons in accordance with a detection of a touch event in an area outside the buddy profile picture.

6. A buddy list presentation control system, comprising:
one or more processors;
memory; and
one or more program instructions stored in the memory that, when executed by the one or more processors, cause the control system to:
acquire user information, the user information comprising buddy grouping information;
determine whether the acquired user information further comprises theme cover information separately corresponding to each buddy group;
add a corresponding theme cover to each buddy group that does not have theme cover information separately according to a preset rule;
obtain through division, according to the buddy grouping information, a display area with a preset size for each buddy group, wherein the preset size is selected from a group of different sizes;
present a buddy list obtained by presenting the theme cover of each buddy group in its corresponding display area;
open a respective buddy group in accordance with a detection of an unfolding operation performed by at least three fingers in a display area of the respective buddy group; and
display a buddy profile picture in a magnified manner and functional buttons in a preset area in accordance with a detection of an unfolding operation performed by at least two fingers on the buddy profile picture, the functional buttons including at least one of a date reminder button, a label adding button and a scrawl button; and
while displaying the buddy profile picture in the magnified manner:
receive a first user input activating the date reminder button;
display, in response to the first user input, a date reminder icon in a semi-transparent manner within a first region of the buddy profile picture;
receive a second user input activating the label adding button; and
display, in response to the second user input, a label in the semi-transparent manner within a second region of the buddy profile picture, wherein the second region is different from the first region.

7. The buddy list presentation control system according to claim 6, wherein, the one or more program instructions further comprises an instructions executed by the one or more processors to present the acquired user information directly when the determining result of the determining module is yes.

8. The buddy list presentation control system according to claim 6, wherein the one or more program instructions further comprises an instruction executed by the one or more processors to separately select a picture from a preset gallery randomly as the theme cover of each buddy group for each buddy group.

9. The buddy list presentation control system according to claim 6, wherein the one or more program instructions further comprises an instruction executed by the one or more processors to close the buddy group in accordance with a detection of a gathering operation performed by the at least three fingers.

10. The buddy list presentation control system according to claim 6, wherein the one or more program instructions further comprises an instruction executed by the one or more processors to close a magnifying display function and conceal the functional buttons in accordance with a detection of a touch event in an area outside the buddy profile picture.

11. One or more non-transitory computer storage mediums comprising a plurality of computer executable instructions for performing a buddy list presentation control method, wherein the plurality of computer executable instructions, when executed by one or more processors of a computer system, cause the computer system to:
acquire user information, the user information comprising buddy grouping information;
determine whether the acquired user information further comprises theme cover information separately corresponding to each buddy group;
add a corresponding theme cover to each buddy group that does not have theme cover information separately according to a preset rule;
obtain through division, according to the buddy grouping information, a display area with a preset size for each buddy group, wherein the preset size is selected from a group of different sizes;
present a buddy list obtained by presenting the theme cover of each buddy group in its corresponding display area;
open a respective buddy group in accordance with a detection of an unfolding operation performed by at least three fingers in a display area of the respective buddy group; and
display a buddy profile picture in a magnified manner and functional buttons in a preset area in accordance with a detection of an unfolding operation performed by at least two fingers on the buddy profile picture, the functional buttons including at least one of a date reminder button, a label adding button and a scrawl button; and while displaying the buddy profile picture in the magnified manner: receive a first user input activating the date reminder button; display, in response to the first user input, a date reminder icon in a semi-transparent manner within a first region of the buddy profile picture; receive a second user input activating the label adding button; and display, in response to the second user input, a label in the semi-transparent manner within a second region of the buddy profile picture, wherein the second region is different from the first region.

12. The computer storage medium according to claim 11, wherein, if it is determined that the acquired user information further comprises theme cover information separately corresponding to each buddy group, the acquired user information is presented directly.

13. The computer storage medium according to claim 11, wherein the plurality of computer executable instructions further comprise:
  separately selecting a picture from a preset gallery randomly as the theme cover of each buddy group for each buddy group.

14. The computer storage medium according to claim 11, wherein the plurality of computer executable instructions further comprise:
  closing the buddy group in accordance with a detection of a gathering operation performed by the at least three fingers.

15. The computer storage medium according to claim 11, wherein the plurality of computer executable instructions further comprise:
  closing a magnifying display function and concealing the functional buttons in accordance with a detection of a touch event in an area outside the buddy profile picture.

* * * * *